3,501,966
PHOTODYNAMIC PICKOFF MEANS HAVING A
PULSE DURATION MODULATED OUTPUT
Sol Shapiro, Oakland, and Constant J. De Cotiis, Cranford, N.J., assignors to Singer-General Precision, Inc., a corporation of Delaware
Filed Dec. 4, 1967, Ser. No. 687,860
Int. Cl. G01c 19/28
U.S. Cl. 74—5.6                                    11 Claims

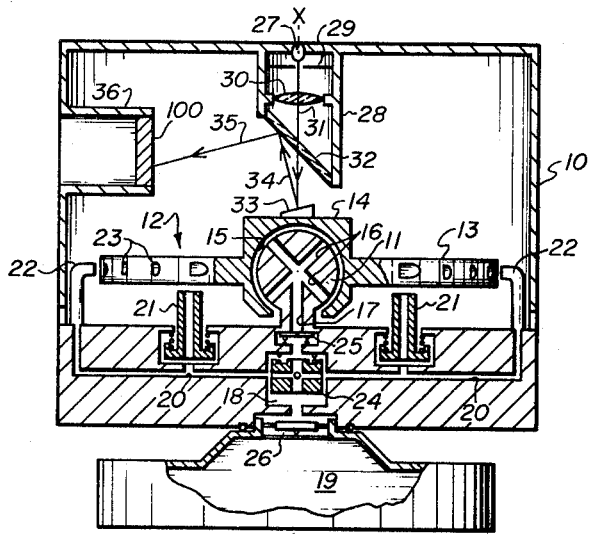
FIG. 1
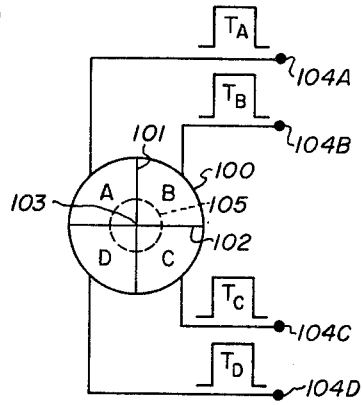
FIG. 4
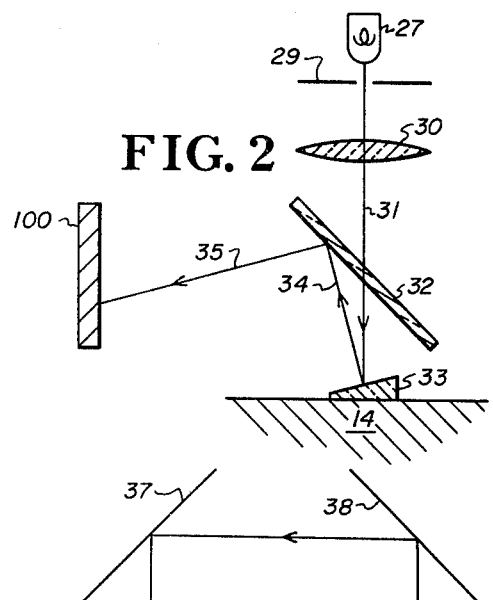
FIG. 2
FIG. 3
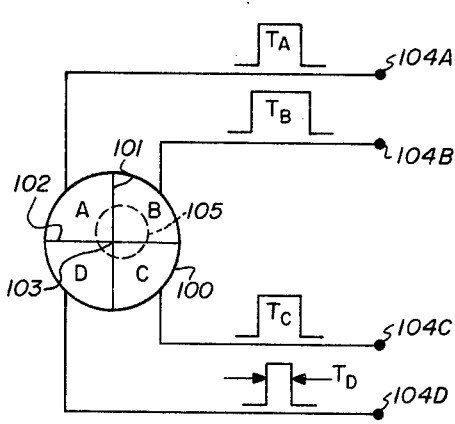
FIG. 5
INVENTORS:
SOL SHAPIRO
CONSTANT J. DECOTIIS
BY
Karl A. Okralik
ATTORNEYS March 24, 1970  S. SHAPIRO ET AL  3,501,966
PHOTODYNAMIC PICKOFF MEANS HAVING A PULSE
DURATION MODULATED OUTPUT
Filed Dec. 4, 1967  2 Sheets-Sheet 2
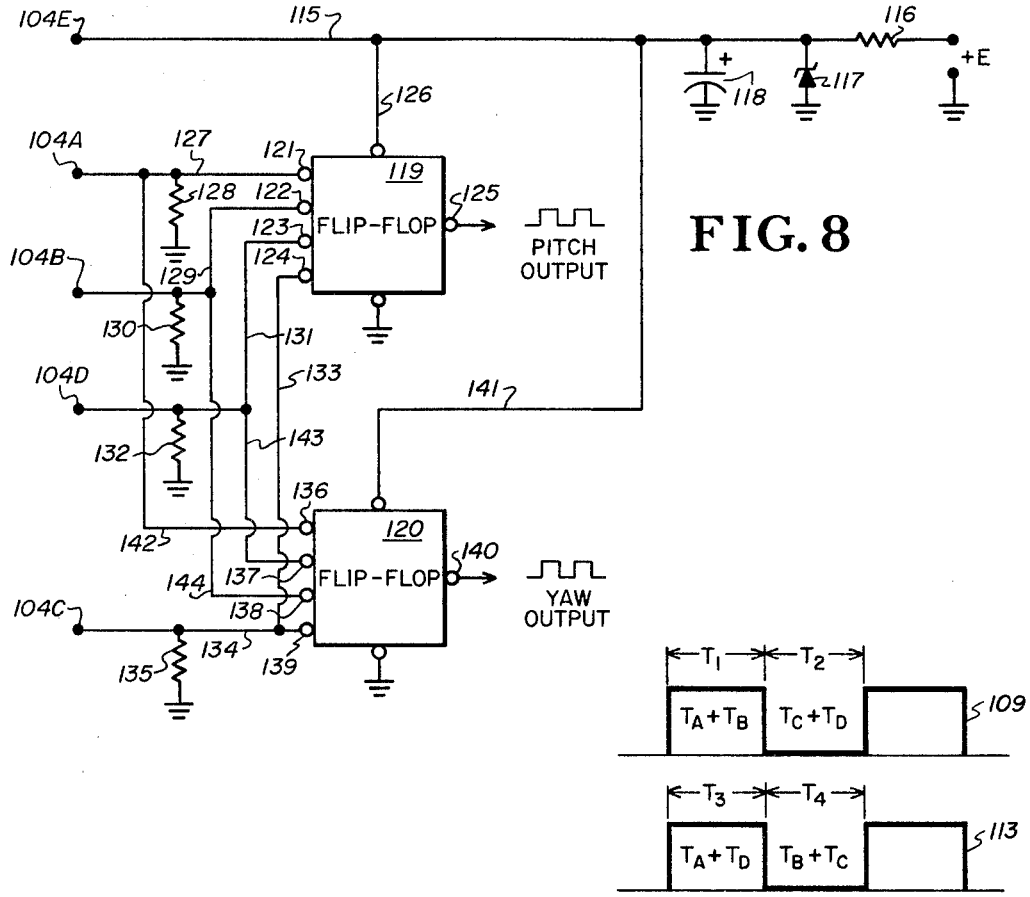
FIG. 8
FIG. 7
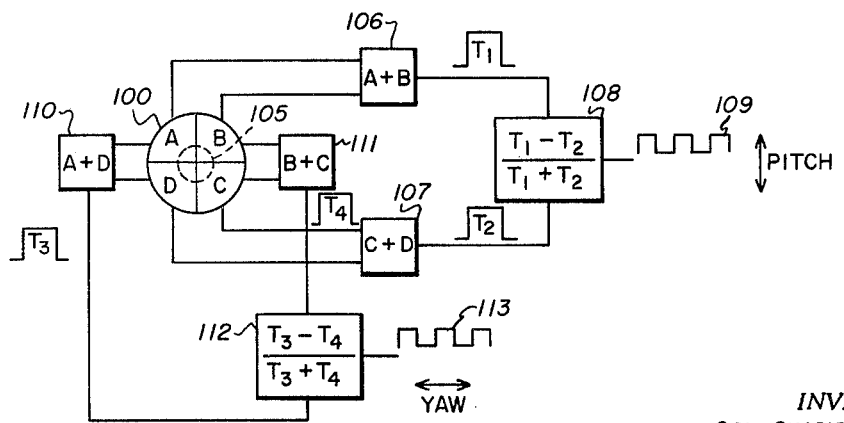
FIG. 6
INVENTORS:
SOL SHAPIRO
CONSTANT J. DECOTIIS
BY Karl A. Ohralik
ATTORNEYS United States Patent Office
3,501,966
Patented Mar. 24, 1970

ABSTRACT OF THE DISCLOSURE

The pickoff system includes a light source and lens arrangement mounted on the housing for directing a parallel incident light beam toward one of the spin axis poles of the rotor member along the stator reference axis. A coplanar mirror is mounted on the rotor member at the aforementioned spin axis pole to reflect the parallel incident light beam and form a reflected light beam which lies at an acute angle with respect to the rotor spin axis, so that the spinning rotor member causes the reflected light beam to rotate about the spin axis and trace a circular path. The center of this circular path will be free to move along two, mutually-perpendicular lines of movement which represent the agular deviations between the rotor spin axis and the stator reference axis in the first and second planes. A photodetector having four independently operable, substantially coplanar portions which are defined by a pair of mutually-perpendicular dividing lines is mounted on the interior of the housing for actuation by the rotating reflected light beam. The photodetector is so oriented that the two dividing lines are coincident with the two, mutually-perpendicular lines of movement of the center of the circular path, so that the center of the circular path coincides with the point of intersection of the dividing lines of the photodetector and each of the four portions of the photodetector produce a series of output pulses having a pulse repetition rate corresponding to the rotor spin speed with the time durations or "widths" of all of the pulses being equal. When the rotor spin axis deviates from the stator reference axis, the center of the path traced by the reflected light beam on the photodetector will be shifted from the point of intersection of the dividing lines and the pulse widths of the four series of pulses will become unequal, so that the relative magnitudes of the pulse widths of the four series of pulses will completely define the angular position of the rotor spin axis with respect to the stator reference axis.

BACKGROUND OF THE INVENTION

Field of the Invention

This invention relates generally to spatial orientation responsive devices and the like and more particularly to photodynamic pickoff means therefor having the capability of supplying two-axis positoinal information in the form of output signals of the pulse duration modulated type.

Description of the prior art

Spatial orientation responsive devices, such as directional gyroscopes, rate gyroscopes, angular accelerometers, and the like, are often employed in aircraft and guided missile applications to provide output signals which represent some aspect of the attitude or motion of the vehicle in which the devices are mounted. A common form of spatial orientation responsive device utilizes a stator member which is fixed in position with respect to the vehicle in which the device is mounted and a spinning rotor member which has one or more degrees of freedom of movement. The spinning rotor member acts as a reference against which positional and motional deviations of the stator and vehicle may be measured. The angular deviations between the rotor spin axis and a stator reference axis in one or more planes representing the degrees of freedom of the device may then be utilized to provide directional, rate or acceleration signals depending upon the application and type of equipment involved. In order to obtain these signals, however, it is necessary to employ a pickoff system which functions to convert the positional difference between the rotor and stator members of the device into an output signal which represents the desired quantity being measured.

A pickoff system which is suitable for use with present day spatial orienton responsive devices should preferably satisfy a number of requirements. For example, it is desirable that the pickoff system produce output signals of the pulse duration modulated type, wherein the informational content of the signal is expressed as the time duration or "width" of the pulses making up the signal rather than the amplitude of the pulses. Signals of this type, which are often refered to as "pulse width modulated signals" may be amplified by a variety of nonlinear, bistable or switch type amplifiers. Pulse duration modulated signals have a dual nature in that they may be used directly as digital signals with the many forms of digital computers and control equipment in use at the present time without the need for undesirable analog-to-digital conversion systems or may be easily converted to analog signals by relatively simple circuit means, such as R-C low pass filters, for example, which function to derive the average value of the series of pulses forming the pulse duration modulated signal. A suitable pickoff system should also be capable of performing its required sensing function without extering any restraining force or "drag" on the rotor member of the spatial orientation responsive device with which the pickoff system is associated. Should such a restraining force be exerted, it is apparent that the operational accuracy of the device could be seriously compromised. This requirement becomes extremely important when the kickof system is employed with gyroscopes of the free-rotor, gas bearing type wherein the rotor member is supported with respect to the stator member by a thin film of gas to provide virtually frictionless operation. It may also be noted that a suitable pickoff system for spatial orientation responsive devices employed in aircraft and guided missile applications must meet the ever present requirements of high accuracy, mechanical ruggedness and reliability of operation which are dictated by the field of application.

A photodynamic pickoff system meeting the aforementioned requirements is disclosed in a copending U.S. patent application of Constant J. De Cotiis for "Photodynamic Pickoff Means Having A Pulse Duration Modulated Output," Ser. No. 687,552 filed on the same date as the present application and assigned to the same assignee as the present application. The pickoff system disclosed in the aforementioned copending patent application employs a light source mounted on either the stator or motor member of the spatial orientation device with which the pickoff is used and a light transmitting aperture formed in the rotor member to produce a light beam which rotates about the spin axis of the rotor as the rotor member spins. A four-section photodetector is employed to translate the closed path traced by the rotating light beam into four series of output pulses having relative pulse widths which are dependent upon the angular deviation between the rotor spin axis and the stator reference axis. The relative magnitudes of the pulse widths forming the four series of pulses serve to completely define the angular position of the rotor spin axis with respect to the stator reference axis in two, mutually-perpendicular planes representing the two degrees of freedom of the gyroscope rotor. When a photodynamic pickoff system of this type is used with a two-axis, free-rotor gyroscope of the type disclosed in U.S. Patent No. 3,416,378 by John L. Evan, et al., for "Free-Rotor Gyro," the light source for the pickoff must be disposed in the spherical stator member of the gyroscope. Since the rotor member of the gyroscope is mounted for rotation about the center of the spherical stator member by hydrostatic gas bearing means, the interior of the stator member must contain the necessary passages for admitting the pressurized gas which creates the gas bearing, with the result that it is difficult to physically place the light source within the stator member. Additionally, since the light source is disposed within the pressurized interior of the gyroscope, it is necessary to use pressure seals to make the necessary electrical connections to the light source. When the aforementioned photodynamic pickoff system is utilized with a gas bearing gyroscope of the type disclosed in U.S. Patent No. 3,187,588 granted to Bernard Parker on June 8, 1965, the light source for the pickoff must be disposed within a spherical rotor member of the gyroscope, since a gas bearing gyroscope of this type employs a spherical rotor which is concentrically disposed within a spherical cavity formed in the stator member. It is accordingly necessary to provide a battery or other means within the spinning rotor member to energize the light source, thereby adding to the weight of the spinning rotor member. Finally, in the pickoff system disclosed in the aforementioned copending patent application of Constant J. De Cottis, the rotating light beam produced by the aperture formed in the rotor member is in the nature of a diffused cone of light rather than a defined or parallel light beam, with the result that the light available from the light source is not used with maximum efficiency and the output signals produced by the photodetector are not at the highest possible levels.

SUMMARY OF THE INVENTION

It is an object of this invention to provide pickoff means of the photodynamic type for spatial orientation responsive devices and the like, wherein the light source and photoelectric transducer means of the pickoff may be compactly packaged and mounted exteriorly of the housing of the spatial orientation responsive device, thereby facilitating the mounting of the pickoff on the device and eliminating the need for pressure seals for electric wiring associated with the pickoff.

It is a further object of this invention to provide pickoff means of the photodynamic type for spatial orientation responsive devices and the like, wherein a defined, parallel light beam is employed to efficiently utilize the available energy from the light source of the pickoff and produce a high intensity light spot on the photoelectric transducer means of the pickoff, thereby increasing the level of the output signals from the pickoff.

It is a still further object of this invention to provide pickoff means of the photodynamic type for spatial orientation responsive devices and the like, wherein a small mirror or other light reflecting device is the only component part of the pickoff which must be mounted on the spinning rotor member of the device, thereby facilitating the use of the pickoff with a wide variety of different types of gyroscopes and other spatial orientation responsive devices having gas bearing means.

It is another object of this invention to provide pickoff means of the photodynamic type for spatial orientation responsive devices and the like, wherein means are provided for decreasing the size of the light spot formed by the rotating light beam of the pickoff on the photoelectric transducer means thereof, to thereby sharply define the limits of the effective operating range of the pickoff.

Briefly, the photodynamic pickoff means of the invention, as applied to a spatial orientation responsive device of the type wherein relative angular movement is permitted between the rotor spin axis and the stator reference axis in at least one plane in which both axes lie, comprises means mounted on the stator member of the device for producing a parallel incident light beam directed toward one of the spin axis poles of the rotor member. Light beam reflecting means are mounted on the rotor member at the said spin axis pole for reflecting the incident light beam to form a reflected light beam which lies at an angle with respect to the rotor spin axis, so that the spinning of the rotor member causes the reflected light beam to rotate about the spin axis and thereby trace a closed path. The line of movement of the center of the closed path will then represent the angular deviations between the rotor spin axis and the stator reference axis in the aforementioned plane. Photoelectric transducer means having at least two independently operable portions are mounted on the stator member for actuation by the rotating reflected light beam. The two portions of the transducer means are disposed on opposite sides of a dividing line which is arranged to be perpendicular to the line of movement of the center of the closed path traced by the reflected light beam. The dividing line is also arranged to bisect the closed path when the rotor spin axis coincides with the stator reference axis, so that each of the transducer portions produces a series of output pulses having a repetition rate corresponding to the rotor spin speed. Since the pulse width of each series of output pulses depends upon the length of the path traced by the reflected light beam on the transducer portion associated with that series, any deviation of the rotor spin axis from the stator reference axis will cause the pulse widths of the two series of pulses to become unequal and the magnitude and sense of the pulse width differential will respectively represent the magnitude and direction of the aforementioned deviation between the spin axis and the reference axis.

When the pickoff means of the invention is employed with spatial orientation responsive devices wherein relative angular movement between the rotor spin axis and the stator reference axis is permited in first and second mutually-perpendicular planes in which the reference axis lies, the photoelectric transducer means has four independently operable portions which are defined by the intersection of a pair of mutually-perpendicular dividing lines. Since the center of the closed path traced by the reflected light beam is now free to move along two, mutually-perpendicular lines of movement, the transducer is so mounted on the stator member that the dividing lines of the transducer quadrisect the closed path traced by the light beam when the rotor spin axis and the stator reference axis are in alignment. By virtue of this arrangement, the four series of output pulses from the transducer means will have pulses of the same width when the rotor spin axis and the stator reference axis are aligned and will have unequal widths when an angular deviation occurs between the two axes. The relative magnitudes of the pulse widths of the four series of output pulses will then completely define angular deviations between the rotor spin axis and the stator reference axis in both of the first and second planes. Suitable circuit means are also provided for combining the four series of output pulses from the photoelectric transducer means to derive two pulse duration modulated output signals which represent the magnitude and direction of the angular displacement of the rotor spin axis from the stator reference axis in the two planes. In order to facilitate the physical placement of the photoelectric transducer means on the stator member with respect to the incident light beam producing means, the invention also contemplates the use of light beam splitting means which are mounted on the stator member at a point along the reference axis thereof for transmitting the incident light beam along the stator reference axis and reflecting the reflected light beam away from the incident light beam producing means.

In practice, the light beam reflecting means may take the form of a simple coplanar mirror which is easily mounted on the rotor member of a wide variety of different types of gyroscopes and other spatial orientation responsive devices. The foregoing arrangement also permits the photoelectric transducer means and the incident light beam producing means to be conveniently packaged and mounted on the stator member of spatial orientation responsive devices of the gas bearing type exteriorly of the pressurized interiors of the devices. The parallel incident light beam may be conveniently produced by a light source and lens arrangement, so that a high intensity spot of light is produced on the face of the photoelectric transducer means, to thereby increase the level of the output signals therefrom. Finally, means are provided to lengthen the optical path between the light source and the lens to decrease the size of the light spot produced by the rotating reflected light beam on the photoelectric transducer means, and thereby sharply define the limits of the effective operating range of the pickoff system.

The nature of the invention and other objects and additional advantages thereof will be more readily understood by those skilled in the art after consideration of the following detailed description taken in conjunction with the accompanying drawings.

BRIEF DESCRIPTION OF THE DRAWINGS

In the drawings:

FIG. 1 is a full sectional view of a two-axis, free-rotor gyroscope of the hydrostatic gas bearing type utilizing the photodynamic pickoff means of the invention;

FIG. 2 is an enlarged view of the basic configuration of the photodynamic pickoff means of the invention;

FIG. 3 is a schematic diagram of an arrangement for lengthening the optical path between the light source and the lens of the pickoff system of the invention to decrease the size of the light spot produced by the rotating reflected light beam on the photoelectric transducer means;

FIG. 4 is a plan view of a four-section photoelectric transducer used in the pickoff system of the invention showing the closed path traced by the beam of light when the stator reference axis is aligned with the rotor spin axis;

FIG. 5 is a plan view of the four-section photoelectric transducer of FIG. 4 showing the path traced by the beam of light when the stator reference axis is not in alignment with the rotor spin axis;

FIG. 6 is a schematic diagram showing the method of combining the four series of output pulses from the photoelectric transducer used in the pickoff system of the invention to obtain two pulse duration modulated output signals providing two-axis positional information;

FIG. 7 is a set of representative waveshapes of the pulse duration modulated output signals derived from the pickoff system of the invention; and FIG. 8 is a circuit diagram of a suitable signal combining circuit which may be employed to derive the two pulse duration modulated output signals of the pickoff from the four outputs of the photoelectric transducer means.

DESCRIPTION OF THE PREFERRED EMBODIMENT OF THE INVENTION

Referring now to FIG. 1 of the drawings, there is shown a two-axis, free-rotor gyroscope having a hydrostatic gas bearing and employing the pickoff means of the invention. The gyroscope illustrated in FIG. 1 is a two-axis, directional gyroscope of the type disclosed in the aforementioned U.S. Patent No. 3,416,378 by John L. Evans, et al. for "Free-Rotor Gyro," to which reference is made for details of construction and operation. As seen in FIG. 1, the gyroscope comprises a substantially cylindrical housing 10 within which is disposed a substantially spherical stator 11 and a rotor 12. The spherical stator 11 may be integral with the gyroscope housing 10 and has a reference axis X—X which bisects the stator. The rotor 12 of the gyroscope is shaped in the manner of a wheel and has a rim portion 13 which extends radially from a central or "hub" portion 14. A substantially spherical cavity 15 is formed in the hub portion 14 of the rotor, so that the rotor 12 may be mounted on the stator 11 with the spherical stator concentrically disposed within the spherical cavity 15. Since as mentioned the spherical stator 11 may be integral with the housing 10 which parts are fixed relative to spinning rotor 12, the term "stator" as used herein in the appended claims may be broadly construed to read on any portion of the housing 10. A plurality of radially extending passageways 16 are formed in the stator 11 and are connected by a centrally disposed passageway 17 to a central inlet port 18. The central inlet port 18 is connected to a gas pressure supply source 19 which may conveniently comprise a tank or "bottle" of pressurized gas, for example. The pressurized gas from the supply source 19 is admitted to the substantially spherical space between the stator 11 and the rotor hub portion 14 by the aforemention passageways 16 and 17 and the central inlet port 18, so that the rotor member 12 is supported on the stator member 11 by a thin film of gas which forms a hydrostatic gas bearing. A gas bearing of this type is virtually frictionless in operation and not only permits the rotor to be spun about its spin axis, but also permits relative angular movement between the rotor spin axis and the stator reference axis X—X in two, mutually-perpendicular planes corresponding to the two degrees of freedom of the gyroscope.

The gyroscope shown in FIG. 1 of the drawings is also provided with means for caging the rotor and bringing the rotor up to full operating spin speed. To this end, the central inlet port 18 is connected by a plurality of passageways 20, formed in the gyroscope housing, to a plurality of caging means 21 which are equidistantly spaced around the stator 11. The caging means 21 are essentially pressure-operated pistons and serve to support the rim portion 13 of the rotor 12 during the spin-up period, so that the spin axis of the rotor is kept in alignment with the stator reference axis X—X. Passageways 20 also serve to connect the central inlet port 18 to a plurality of jet pipes 22 which are disposed equidistantly around the inner periphery of the housing 10. The jet pipes 22 cooperate with a plurality of turbine bucket grooves 23, formed about the periphery of the rim portion 13 of the rotor, to bring the rotor member up to operating spin speed. A control valve 24 is provided at the central inlet port 18 to "program" or control the starting sequence of the gyroscope and pressure regulating means 25 are disposed between the inlet port 18 and the central passageway 17 to regulate the gas pressure supplied to the gas bearing. A master starting device in the form of a rupturable diaphragm and pin arrangement 26 is disposed between the gas pressure supply source 19 and the central inlet port 18.

When the gyroscope is mounted in a vehicle, such as a guided missile, for example, the rupturable diaphragm and pin arrangement 26 is activated by the acceleration of the vehicle and functions to connect the gas pressure supply source 19 to the gas bearing arrangement and the caging and rotor spin up mechanisms through the control valve 24. When the caging mechanisms 21 are activated by the gas pressure, they move into position underneath the rim portion 13 of the rotor and serve to bring the rotor spin axis into alignment with the stator reference axis X—X. At the same time, the gas jet pipes 22 impinge upon the turbine bucket grooves 23, formed in the periphery of the rim portion 13 of the rotor, and cause the rotor to spin about the spin axis. Since the gas pressure supply source 19 comprises a tank or "bottle" of pressurized gas, after a period of time the gas pressure from the source will decrease below a predetermined level and the control valve 24 will shut off the gas supplied to the caging mechanisms 21 and the jet pipes 22. This action uncages the rotor and permits it to spin without hindrance at its predetermined operating speed. The control valve 24, however, still permits the remaining gas in the supply source 19 to be supplied to the gas bearing arrangement, while the pressure regulator 25 serves to control the pressure supplied to the gas bearing. At this time, the rotor spin axis is free to deviate from the stator reference axis, so that when the gyroscope is mounted in a vehicle, such as an aircraft or guided missile, for example, the movements of the vehicle about two of its axes, such as the yaw and pitch axes, for example, will cause the rotor spin axis to angularly deviate from the stator reference axis X—X in two, mutually-perpendicular planes in which the stator reference axis lies. The angular deviation between the rotor spin axis and the stator reference axis in one plane will be proportional to the pitch of the vehicle, while the angular deviation between the rotor spin axis and the stator reference axis in the other plane will be proportional to the yaw of the vehicle, so that the directional gyroscope illustrated is capable of providing two-axis positional information.

In order to sense the angular deviations between the rotor spin axis and the stator reference axis X—X in the two, mutually-perpendicular planes, a photodynamic pickoff system is provided for the gyroscope. As shown in FIGS. 1 and 2 of the drawings, the pickoff system comprises a light source 27 which is mounted on the housing 10 within a cylindrical projection 28 extending from the housing along the stator reference axis X—X. The light source 27 is preferably a solid-state light emitter which provides a source of light in the infra-red range of the spectrum and may conveniently comprise, for example, a gallium arsenide infrared emitting diode. It will be understood, however, that the pickoff means of the invention will also operate with a light source which provides light in the visible range of the spectrum. The electric power for the light source 27 may be obtained from any convenient source (not shown), such as a battery, for example, which is located exteriorly of the gyroscope housing 10. Since the light source 27 provides the means for operating the pickoff system of the invention, it is desirable that the light source not be energized until the rotor 12 is brought up to full operating speed and the rotor is uncaged, to thereby prevent the generation of spurious output signals by the pickoff. This may be accomplished by any convenient means, such as a pressure responsive switch, for example, which is responsive to the pneumatic pressure used to operate the gyro caging and spin-up mechanisms. The light emitted by the solid-state light emitting diode 27 is applied to an aperture 29 and a lens 30, which are also disposed within the cylindrical projection 28, to form a parallel incident light beam 31 which is coincident with the stator reference axis X—X.

A light beam splitter 32 is disposed in the cylindrical projection 28 and serves to transmit the parallel incident light beam 31 to a coplanar mirror 33 which is mounted on the hub portion 14 of the rotor 12 at one of the spin axis poles thereof. The coplanar mirror 33 is so mounted on the rotor hub portion 14 that the plane of the mirror is not perpendicular to the rotor spin axis and the parallel incident light beam 31 is reflected from the surface of the mirror to form a reflected light beam 34 which lies at an acute angle with the rotor spin axis. Accordingly, as the rotor 12 spins about its spin axis, the reflected light beam 34 will rotate about the spin axis and trace a closed path upon the surface of the light beam splitter 32. The light beam splitter 32 is an optical device which functions to both transmit and reflect light rays which are directed at its surface. Whether the light beam splitter acts to transmit a light beam or to reflect a light beam, depends upon the angle of incidence which the light beam makes with the surface of the beam splitter. In practice, the light beam splitter may comprise a half-silvered mirror, for example. It may be noted at this time, that the light beam splitter 32 is mounted on the inner end of the cylindrical projection 28, so that the beam splitter itself may serve as a seal to separate the pressurized interior of the housing 10 of the gyroscope from the light source 27. By virtue of this arrangement, it is apparent that pressure seals are not required for the electric wiring for the light source since the light source itself is located exteriorly of the pressurized housing. Furthermore, this arrangement permits the light source to be energized from any convenient source of power which may be located exteriorly of the gyroscope. The beam splitter 32 is disposed at an angle of approximately 45° with respect to the stator reference axis X—X and functions to transmit the parallel incident light beam 31 directly along the reference axis. However, the reflected light beam 34 from the mirror 33 strikes the surface of the beam splitter at a different angle, so that the reflected light beam 34 is reflected away from the stator reference axis X—X to form a reflected light beam 35, as illustrated. The reflected light beam 35 is directed away from the stator reference axis X—X and is arranged to strike the face of a photoelectric transducer 100 which is mounted on the inner end of a cylindrical projection 36 which extends interiorly of the housing 10 of the gyroscope. The photoelectric transducer 100 may cooperate with the cylindrical projection 36 to form a seal between the pressurized interior of the gyroscope housing 10 and the exterior of the housing, so that the electrical leads associated with the transducer do not require the use of pressure seals. Since the beam splitter 32 functions to reflect the reflected light beam 34 away from the light source and lens arrangement, the physical placement of the photoelectric transducer 100 on the interior of the housing 10 does not interfere with the light source and is greatly facilitated. In operation, as the rotor 12 spins about its spin axis, the mirror 33 will rotate and will cause the reflected light beam 34 to rotate about the spin axis and trace a closed path on the surface of the light beam splitter 32. The beam of light 35 which is reflected from the surface of the beam splitter will then trace a circular path on the face of the photoelectric transducer 100.

It may be noted at this time that the light source 27, the aperture 29 and the lens 30 combine to produce a parallel or sharply defined incident light beam which has a relatively high intensity, so that the photoelectric transducer 100 will produce electric output signals at a correspondingly high level, thereby minimizing the need for substantial amplification of these signals. The use of a lens system also permits the physical size of the spot of light formed by the reflected light beam 35 on the face of the photoelectric transducer 100 to be readily controlled, since the magnification of the light spot is equal to the length of the optical path between the lens 30 and the photoelectric transducer 100 divided by the length of the optical path between the light emitter 27 and the lens 30. Accordingly, it is apparent that if the length of the optical path between the lens 30 and the photoelectric transducer 100 is kept constant and the length of the optical path between the light emitter 27 and the lens 30 is increased, the magnification and, consequently, the physical size of the light spot on the face of the transducer will be decreased. For reasons which will be set forth hereinafter, a reduction in the physical size of the light spot is desirable to sharply define the limits of the effective operating range of the pickoff. An arrangement for accomplishing this is shown in FIG. 3 of the drawings, wherein reference characters with a prime notation are employed to designate components which are the same as or similar to the components employed in the arrangement of FIGS. 1 and 2 of the drawings. As seen in FIG. 3, the optical path between the light emitter 27′ and the lens 30′ is lengthened by means of mirrors 37 and 38. The plane surface of each of the mirrors 37 and 38 is disposed at an angle of 45° with respect to the light beam incident thereto, so that the beam of light emitted from light source 27' is completely reversed in direction during the time it travels from the light emitter 27' to the lens 30'. Accordingly, an arrangement of this type for lengthening the optical path of the parallel incident light beam is of great value in gyroscopes and other spatial orientation responsive devices having a relatively small distance available for the mounting of components along the stator reference axis. It may be noted that the lengthening of the optical path in FIG. 3 of the drawings will not affect the diameter of the circular path traced by the light beam on the face of the photoelectric transducer 100.

As seen in FIG. 4 of the drawings, the face of the photoelectric transducer 100 is substantially circular and is divided into four coplanar portions or sections 100A, 100B, 100C and 100D by a pair of mutually-perpendicular dividing lines 101 and 102. The transducer 100 may conveniently comprise a silicon photodetector, for example, which functions essentially as a light responsive resistance wherein the electrical resistance presented by the detector varies as a function of the intensity of the light striking the surface of the detector. When an infrared light emitter is employed as the light source, the photodetector may be selected to have a peak response in the infra-red range of the spectrum, to thereby insure an optimum output signal. In a four-section photodetector of this type, a single source of voltage is utilized to energize the detector, but each of the four sections of the detector is provided with a separate output, so that each section of the detector functions independently of the remaining sections. In discussing the orientation of the photodetector 100 with respect to the movements of the light beam 35, it may be noted that as the rotor spin axis angularly deviates from the stator reference axis in one of the two, mutually-perpendicular planes representing the two degrees of freedom of the gyroscope rotor, the center of the circular path traced by the light beam on the face of the photodetector will move along a straight line. Similarly, as the rotor spin axis deviates from the stator reference axis in the other mutually-perpendicular plane, the center of the circular light path will move along a second straight line which is perpendicular to the first line of movement. Accordingly, the photodetector 100 is mounted on the interior of the housing 10 of the gyroscope in such a manner that the two dividing lines 101 and 102 on the face of the detector are coincident with the two lines of movement of the center of the circular path.

Because of this arrangement, when the rotor spin axis is coincident with the stator reference axis, the two dividing lines 101 and 102 will quadrisect the circular path traced by the light beam. For example, the dividing line 101 on the face of the photodetector 100 may be made coincident with the line of movement traced by the center of the circular light path which is caused by pitch axis deviations sensed by the gyroscope, while the dividing line 102 of the photodetector may be made coincident with the line of movement of the center of the circular light path caused by yaw axis deviations. Under these conditions, and when the vehicle is in the gyroscope is mounted is not subject to any yaw or pitch deviations, the spin axis of the rotor 12 is in alignment with the reference axis X—X of the stator 11 and the center of the circular path 105 traced by the beam of light is coincident with the point of intersection 103 of the dividing lines 101 and 102. Accordingly, the circular path 105 traced by the rotation of the reflected light beam 35 will be divided into four equal lengths and the photodetectors 100 will sequentially produce four output pulses having the same amplitude and the same pulse width, as shown in FIG. 4 of the drawings. Assuming that a common supply terminal 104E (not shown in this view) of the photodetector is connected to a positive source of D.C. voltage, the four output pulses will be produced at output terminals 104A, 104B, 104C and 104D of the photodetector as illustrated.

Since the gyroscope rotor is continually spinning, each of the four sections of the photodetector will produce a series of output pulses having a pulse repetition rate corresponding to the rotor spin speed. The amplitude of these pulses will be constant if the intensity of the light beam is constant. Since the width or time duration of the output pulses produced by each of the four sections of the photodetector 100 is determined by the length of the path traversed by the light beam in that section, when the path is quadrisected by the dividing lines 101 and 102 so that the light path is divided into four equal lengths, the pulse widths of the four output pulses will be of equal magnitude, as illustrated.

In order to illustrate the operation of the photodynamic pickoff system of the invention, it will be assumed that the vehicle in which the gyroscope is mounted is subject to both yaw and pitch axis deviations which will cause the spin axis of the rotor 12 to move angularly with respect to the stator reference axis X—X, the movement being such that the center of the circular path 105 traced by the light beam will lie within section 100B of the photodetector as shown in FIG. 5 of the drawings. Since the circular path 105 traced by the light beam is no longer divided into four equal segments, the four sequentially occurring output pulses appearing at the terminals 104A through 104D of the photodetector, will no longer be of equal time duration, but will however, remain at the same amplitude. Under the assumed conditions, the output pulses from section 100B of the photodetector will have a width $T_B$ which is greater than the widths of the pulses from the remaining sections, since the largest portion of the circular path 105 lies in section 100B of the photodetector. Similarly, in the example illustrated in FIG. 5 of the drawings, the widths $T_A$ and $T_C$ of the respective pulses from sections 100A and 100C of the photodetector will be substantially equal, but will be smaller than the pulse width $T_B$ of the pulses from section 100B. Since the portion of the circular path 105 which is located in section 100D of the photodetector has the shortest length, the pulse width $T_D$ of the pulses from that section will be the smallest of all the pulses generated by the photodetector. It will be understood that each of the four sections of the photodetector 100 produces a series of the output pulses illustrated for that section and that the pulse repetition rate of the pulses in the series will correspond to the rotor spin speed.

As thus far described, it is believed apparent that the four series of output pulses of equal amplitude, but variable width, produced by the photodetector 100 will serve to completely define the deviation of the rotor spin axis from the stator reference axis X—X in both of the mutually-perpendicular planes which represent the two degrees of freedom of the gyroscope. Assuming that the gyroscope and the photodetector 100 are so oriented that movements of the vehicle in which the gyroscope is mounted about the pitch axis of the vehicle will cause the center of the circular light path 105 to move along the dividing line 101 on the face of the photodetector 100, it is seen that the differential between the sum of the pulse widths of the pulses from sections 100A and 100B of the photodetector and the sum of the pulse widths of the pulses from sections 100C and 100D of the photodetector will be proportional to the pitch axis deviation of the vehicle and will indicate the displacement of the center of the circular path 105 with respect to the dividing line 102. For example, when the angular displacement of the rotor spin axis from the stator reference axis X—X causes the center of the circular path 105 to move above the line 102 on the face of the photodetector, the sum of the pulse widths $T_A$ and $T_B$ will be greater than the sum of the pulse widths $T_C$ and $T_D$, since the greater portion of the circular path 105 lies above the line 102. Similarly, when the center of the circular path 105 moves below the line 102, the sum of the pulse widths $T_C$ and $T_D$ will become greater than the sum of the pulse widths $T_A$ and $T_B$, so that the magnitude and sense of the pulse width differential between the two sets of pulses respectively represent the magnitude and direction of the pitch axis deviations. In a similar manner, the magnitude and sense of the pulse width differential between the sum of the pulse widths of the pulses from sections 100A and 100D of the photodetector and the sum of the pulse widths of the pulses from sections 100B and 100C will respectively represent the magnitude and direction of the deviation of the vehicle about the yaw axis. Accordingly, it is apparent that the relative magnitudes of the four series of pulses produced by the photodetector 100 will completely define any combination of yaw and pitch displacements of the vehicle in which the gyroscope is mounted.

It may be noted that the limits of the effective operating range of the pickoff are exceeded when the circular path 105 traced by the light beam does not have a portion of its length lying in each of the four sections 100A through 100D of the photodetector. For example, should the pitch axis deviation sensed by the pickoff increase to the point where the entire circular path 105 lies within sections 100A and 100B of the photodetector, no output pulses will be produced by sections 100C and 100D, with the result that further increases in the pitch deviation cannot be sensed until the circular path moves off of the face of the photodetector. Accordingly, the limits of the operating range of the pickoff are reached when the circular path 105 approaches either of the dividing lines 101 and 102. For this reason, it is desirable that the size of the light spot produced by the light beam on the face of the photodetector 100 be kept as small as possible to produce a sharply defined circular path 105. To this end, the arrangement for lengthening the optical path shown in FIG. 3 of the drawings may be employed to sharply define the limits of the effective operating range of the pickoff.

The method of combining the four series of output pulses from the photodetector 100 is schematically illustrated in FIG. 6 of the drawings, wherein the output pulses from sections 100A and 100B of the photodetector 100 are shown as being applied to a summing circuit 106 which functions to provide an output pulse having a width $T_1$ which is equal to the sum of the pulse widths $T_A$ and $T_B$. Similarly, the output pulses from sections 100C and 100D of the photodetector are applied to a summing circuit 107 which functions to produce an output pulse having a width $T_2$ which is equal to the sum of the pulse widths $T_C$ and $T_D$. The output pulses from summing circuits 106 and 107 are applied to a modulation circuit 108 which functions to produce a single series of output pulses 109 which is a pulse duration modulated signal representing the pitch axis deviation sensed by the gyro. The waveshape of the output signal 109 from the modulation circuit 108 is shown in detail in FIG. 7 of the drawings, wherein it is seen that the signal 109 comprises a series of pulses having a width $T_1$ which are separated by time periods $T_2$. Since $T_1$ is the sum of the pulse widths $T_A$ and $T_B$ and $T_2$ is the sum of the pulse width $T_C$ and $T_D$, it is seen that the waveshape 109 completely defines both the magnitude and sense of the pulse width differential between the two sets of summed pulses and consequently represents both the magnitude and direction of the pitch axis deviations sensed by the gyroscope. The modulation fraction $M_P$ for the pitch axis is given by the expression $$(1) \qquad M_P = \frac{T_1 - T_2}{T_1 + T_2}$$

Referring again to FIG. 6 of the drawings, the output pulses from sections 100A and 100D of the photodetector are applied to a summing circuit 110 which functions to provide an output pulse having a width $T_3$ which is equal to the sum of the pulse widths $T_A$ and $T_D$. The output pulses from sections 100B and 100C of the photodetector are applied to a summing circuit 111 which functions to produce an output pulse having a width $T_4$ which is equal to the sum of the pulse widths $T_B$ and $T_C$. The output pulses from summing circuits 110 and 111, which represent the yaw axis deviation sensed by the gyroscope, are applied to a modulation circuit 112 which functions to produce a series of output pulses 113 which is a pulse duration modulated signal representing the yaw axis deviation. The waveshape of the pulse duration modulated output signal 113 from the modulation circuit 112 is shown in detail in FIG. 7 of the drawings, wherein it is seen that the signal comprises a series of pulses having a width $T_3$ which is equal to the sum of the pulse widths $T_A$ and $T_D$. The time interval $T_4$ between the pulses is equal to the sum of the pulse widths $T_B$ and $T_C$. Accordingly, the ratio of the pulse time on $T_3$ to pulse time off $T_4$ serves to completely define the magnitude and direction of yaw axis deviations sensed by the gyroscope. The modulation fraction $M_Y$ for the yaw axis is given by the expression $$(2) \qquad M_Y = \frac{T_3 - T_4}{T_3 + T_4}$$

The circuit diagram of a signal combining circuit capable of performing the aforementioned method of combining the output pulses from the photodetector 100 is shown in FIG. 8 of the drawings. As seen in FIG. 8, the common supply terminal 104E of the photodetector 100 is connected to a D.C. voltage supply source +E by means of a lead 115 and an input resistance 116 to energize the photodetector. A shunt-connected Zener diode 117 and a shunt capacitor 118 are provided across the voltage output from the source +E to regulate and filter the voltage supply. The functions performed by the summing circuits 106 and 107 and the modulation circuit 108 with respect to the pitch axis deviations in FIG. 6 of the drawings are performed by a single flip-flop circuit 119 in the arrangement of FIG. 8 of the drawings. In a similar manner, a second flip-flop circuit 120 in FIG. 8 performs the functions of the summing circuits 110 and 111 and the modulation circuit 112 with respect to the yaw axis deviations. The flip-flop circuits 119 and 120 may conveniently comprise a commercially available flip-flop circuit having dual set inputs and dual reset inputs, such as Motorola type MC302 or MC352A, for example. Essentially, a flip-flop circuit of this type is a logic circuit having a bistable operating characteristic wherein the circuit may be triggered into one stable operating state by energization of either or both of the dual set inputs and triggered into the other stable operating state by energization of either or both of the dual reset inputs. When the set and reset inputs of the flip-flop circuit are successively, alternately activated, the output from the flip-flop circuit will be a series of square waves or pulses having a time duration which is determined by the cyclic triggering of the set and reset inputs. The amplitude of the output pulses from the flip-flop circuit will be constant and will be determined by the magnitude of the voltage supply and the parameters of the circuit. Referring again to FIG. 8 of the drawings, the flip-flop circuit 119 is shown as comprising dual set inputs 121 and 122 which are parallel-connected and dual reset inputs 123 and 124 which are also parallel-connected, so that energization of either of the set inputs will trigger the flip-flop into one stable operating state and energization of either of the reset inputs will trigger the flip-flop into the other stable operating state. The flip-flop 119 is provided with an output 125 at which the pulse duration modulated signal representing the pitch output of the pickoff appears. Flip-flop 119 is connected to the D.C. supply voltage source +E by means of a lead 126 and the lead 115. The set input 121 of the flip-flop is connected to the output terminal 104A of the photodetector 100 by means of a lead 127 and an input resistance 128, while the set input 122 of the flip-flop is connected to output terminal 104B of the photodetector by means of a lead 129 and an input resistance 130. The reset input 123 of the flip-flop is connected to the output terminal 104D of the photodetector by means of a lead 131 and an input resistance 132, while the reset input 124 is connected to the output terminal 104C of the photodetector by means of leads 133 and 134 and an input resistance 135. In a similar fashion, the flip-flop circuit 120 is provided with dual parallel-connected set inputs 136 and 137 and dual parallel-connected reset inputs 138 and 139. The output 140 of the flip-flop 120 provides a pulse duration modulated signal which represents the yaw axis deviation sensed by the gyroscope. The voltage supply for the flip-flop 120 is obtained from the D.C. voltage supply source +E by means of a lead 141 and the lead 115, so that both flip-flops and the photodetector 100 are energized by a single D.C. supply voltage source. In practice, the D.C. supply voltage may be of the order of magnitude of +28 volts, for example. The set input 136 of flip-flop 120 is connected to the output terminal 104A of the photodetector by means of a lead 142, while the other set input 137 of the flip-flop is connected to the output terminal 104D of the photodetector by means of a lead 143 and the input resistance 132. The reset input 138 of the flip-flop is connected to the output terminal 104B of the photodetector by means of a lead 144 and the input resistance 130, while the other reset input 139 of the flip-flop is connected to the output terminal 104C of the photodetector by means of lead 134 and the input resistance 135.

By virtue of the foregoing arrangement, the set inputs 121 and 122 of the flip-flop 119 are connected to sections 104A and 104B of the photodetector, so that the flip-flop 119 will be triggered into its first stable operating state by the pulses from these sections and will remain in the first stable operating state during the time that the light beam traverses these sections. Accordingly, the dual parallel-connected set inputs function in the manner of a summing circuit to provide a pulse having a time duration $T_1$ which is equal to the sum of the pulse widths $T_A$ and $T_B$. Since the reset inputs 123 and 124 of flip-flop 119 are similarly connected to sections 100C and 100D of the photodetector, the flip-flop 119 will be triggered to its second stable operating state by the pulses from these sections and will remain in the second operating state for a time duration $T_2$ which is equal to the sum of the pulse widths $T_C$ and $T_D$. Accordingly, the output from flip-flop circuit 119 appearing at output terminal 125 will be a series of pulses having the waveshape 109 shown in FIG. 7 of the drawings and will be a pulse duration modulated signal representing the pitch axis deviations sensed by the gyroscope. In a similar manner, the set inputs 136 and 137 of the flip-flop 120 are connected to sections 104A and 104D of the photodetector and function to cause the flip-flop 120 to generate an output pulse having a time duration $T_3$ which is equal to the sum of the pulse widths $T_A$ and $T_D$ of the pulses from these sections. The flip-flop circuit 120 will be triggered into its second stable operating state by the pulses applied to the reset inputs 138 and 139 which are respectively connected to the sections 100B and 100C of the photodetector, so that no pulse will be produced for a period of time $T_4$ which is equal to the sum of the pulse widths $T_B$ and $T_C$ of the output pulses from these sections. Accordingly, the output signal appearing at output terminal 140 of flip-flop 120 will be a series of pulses having the waveshape 113 shown in FIG. 7 of the drawings and will be a pulse duration modulated signal representing the yaw axis deviations sensed by the gyroscope.

From the foregoing analysis, it is believed apparent that the photodynamic pickoff system of the invention provides two-axis positional information in the form of pulse duration modulated signals which may be employed directly in instrumentation and control systems of the digital type without the necessity of utilizing any analog-to-digital conversion equipment. For example, the pulse duration modulated pitch and yaw signals from the pickoff system of the invention could be utilized directly to control electromechanical gas valves for thrust control of a guided missile. Since the informational content of the pulse duration modulated signals is contained in the ratio of pulse time on to pulse time off, rather than the amplitudes of the pulses, the signals are true digital signals and will be substantially independent of rotor spin speed, so that the pickoff will continue to function with a high degree of accuracy even with "run down" gyros. If desired, the pulse duration modulated pitch and yaw output signals from the pickoff system of the invention may be averaged by means, such as an R-C, low pass filter, for example, to derive analog signals which are proportional to the pitch and yaw deviations sensed by the gyroscope. Again, the analog signals will be virtually independent of the rotor spin speed and will enable the pickoff to operate with a high degree of accuracy under conditions of slowly diminishing rotor spin speed. This dual nature of the pulse duration modulated signals from the pickoff system of the invention permits the pickoff system to have great flexibility of use in applications requiring either digital or analog signals. When the pickoff system is employed with gyroscopes or other spatial orientation responsive devices providing only single axis positional information, the photodetector 100 need only comprise two sections and the necessity for pulse width summing means is dispensed with. Since the sensing operations performed by the pickoff system of the invention depend upon the movement of a beam light, it is obvious that the pickoff system does not impose any undesirable load or drag on the movements of the rotor member of the gyroscope and therefore does not impair the gyroscope accuracy of operation. Accordingly, the pickoff system is especially suited for use with free-rotor gyroscopes of the gas bearing type.

It is also believed apparent that the major component parts of the pickoff system of the invention are susceptible of packaging as a compact unit and may be mounted exteriorly of the pressurized interior of the gyroscope or other spatial orientation responsive device in which the pickoff is employed. Since the only part of the pickoff system of the invention which is mounted on the spinning rotor is the small mirror 33, the pickoff system may be readily used with a wide variety of gyroscopes and other spatial orientation responsive devices. For example, in the hydrostatic gas bearing gyroscope disclosed in the aforementioned U.S. Patent No. 3,187,588 granted to Bernard Parker on June 8, 1965, wherein the gyroscope comprises a substantially spherical rotor member which is disposed in a substantially spherical cavity formed in the stator member, the small mirror 33 could be mounted on the spherical rotor at one of the spin axis poles thereof and the light source and photodetector could be mounted exteriorly of the pressurized cavity of the stator member. Finally, it is apparent that the pickoff system of the invention utilizes a simple, integrated photoelectric transducer arrangement to provide two-axis positional information without any undesirable cross-coupling and possesses the high accuracy of operation and mechanical ruggedness which are necessary for aircraft and guided missile applications.

It is believed obvious that many changes could be made in the construction and described uses of the foregoing pickoff system and many seemingly different embodiments of the invention could be constructed without departing from the scope thereof. For example, the pickoff system of the invention may be utilized with other types of spatial orientation responsive devices, such as rate gyros, angular accelerometers, and inertial platforms. Accordingly, it is intended that all matter contained in the above description or shown in the accompanying drawings shall be interpreted as illustrative and not in a limiting sense.

What is claimed is:
1. Photodynamic pickoff means for spatial orientation responsive devices and the like of the type having a stator member, a spinning rotor member, and bearing means interposed between said members for supporting the spinning rotor member to permit relative angular movement between the spin axis of the rotor member and a reference axis of the stator member in at least a first plane in which said axes lie, comprising means mounted on said stator member coaxial to said reference axis for producing a parallel incident light beam directed toward one of the spin axis poles of the rotor member; light beam reflecting means mounted on said rotor member at said one spin axis pole thereof for reflecting the incident light beam to form a reflected light beam which lies at an angle with respect to the rotor spin axis, light beam splitting means mounted on said stator member intermediate said reflecting means and said incident light beam producing means for transmitting the incident light beam and reflecting the reflected light beam away from said incident light beam producing means, and photoelectric transducer means mounted on said stator member and having a sensitive surface responsive to the reflected light beam from said beam splitting means the rotation of the rotor member about the spin axis thereof causing said reflected light beam to rotate about the spin axis and thereby trace a closed path of constant intensity light upon said transducer's surface whereby the line of movement of the center of the closed path represents the angular deviations between the rotor spin axis and the stator reference axis in said first plane; said photoelectric transducer means having its said sensitive surface divided into at least two independently operable portions for actuation by the rotating reflected light beam, the two portions of said surface being disposed on opposite sides of a dividing line which is perpendicular to the said line of movement of the center of the closed path and which bisects the closed path when the rotor spin axis coincides with the stator reference axis, so that each of said transducer portions produces a series of output pulses having a pulse repetition rate corresponding to the rotor spin speed and a pulse width representing the angular deviation between the rotor spin axis and the stator reference axis in said first plane, whereby the magnitude and sense of the differential between the pulse widths of the two series of output pulses respectively represent the magnitude and direction of the angular deviation between the rotor spin axis and the stator reference axis in said first plane.

2. Photodynamic pickoff means as claimed in claim 1, wherein said parallel incident light beam is coincident with the stator member reference axis, the reflected light beam forms an acute angle with the rotor spin axis, and light beam splitting means are provided on the stator member at a point along the reference axis thereof for transmitting the incident light beam and reflecting the reflected light beam away from the said incident light beam producing means, to thereby facilitate the physical placement of said photoelectric transducer means on the stator member.

3. Photodynamic pickoff means as claimed in claim 2, wherein said light beam reflecting means comprises a coplanar mirror.

4. Photodynamic pickoff means as claimed in claim 2, wherein said parallel incident light beam producing means comprises an infra-red emitter and said photoelectric transducer means is selected to have a peak output in the infra-red range of the spectrum.

5. Photodynamic pickoff means as claimed in claim 2, wherein said parallel incident light beam producing means comprises a light source and a lens; and means, including at least one mirror, are provided for lengthening the optical path between the light source and the lens, to thereby decrease the size of the light spot produced by said rotating reflected light beam on said photoelectric transducer means.

6. Photodynamic pickoff means as claimed in claim 2, wherein relative angular movement between the rotor spin axis and the stator reference axis is permitted in a second plane perpendicular to said first plane, the line of intersection of said planes being coincident with the stator reference axis, and said photoelectric transducer surface has four independently operable portions defined by the intersection of said first-named dividing line with a second dividing line perpendicular thereto, the said first and second dividing lines being arranged to quadrisect the closed path traced by the rotating reflected light beam when the rotor spin axis coincides with the stator reference axis, so that each of the four transducer portions produces a series of output pulses having a repetition rate corresponding to the rotor spin speed and a pulse width representing the angular deviation between the rotor spin axis and the stator reference axis in both of said planes, whereby the relative magnitudes of the pulse widths of the four series of output pulses completely define the angular deviation between the rotor spin axis and the stator reference axis in both of said planes.

7. Photodynamic pickoff means as claimed in claim 6, further comprising first circuit means for summing the pulse widths of the output pulses from the transducer portions disposed on one side of said first dividing line, summing the pulse widths of the output pulses from the transducer portions disposed on the other side of said first dividing line, and producing a first pulse duration modulated output signal representing the magnitude and sense of the differential between the summed pulse widths from the transducer portions disposed on opposite sides of the first dividing line; and second circuit means for summing the pulse widths of the output pulses from the transducer portions disposed on one side of said second dividing line, summing the pulse widths of the output pulses from the transducer portions disposed on the other side of said second dividing line, and producing a second pulse duration modulated output signal representing the magnitude and sense of the differential between the summed pulse widths from the transducer portions disposed on opposite sides of the second dividing line, whereby said first pulse duration modulated output signal represents the magnitude and direction of the angular deviation between the rotor spin axis and the stator reference axis in said first plane and said second pulse duration modulated output signal represents the magnitude and direction of the angular deviation between the rotor spin axis and the stator reference axis in said second plane.

8. Photodynamic pickoff means as claimed in claim 7, wherein each of said first and second circuit means comprises a flip-flop circuit having dual set and reset inputs respectively coupled to the transducer portions disposed on opposite sides of the dividing line associated with that circuit means.

9. Photodynamic pickoff means for spatial orientation responsive devices and the like of the type having a substantially spherical stator member disposed within a hollow housing, a spinning rotor member having a hub portion with a substantially spherical cavity concentrically disposed about said stator member, and gas bearing means interposed between the stator member and the hub portion of the rotor member to permit relative angular movement between the spin axis of the rotor member and a reference axis of the stator member in first and second mutually-perpendicular planes in which the reference axis lies, comprising a light source and lens arrangement mounted on said housing for producing a parallel incident light beam directed toward one of the spin axis poles of the rotor member and coincident with the stator reference axis; a coplanar mirror mounted on the rotor member at the said one spin axis pole thereof for reflecting the parallel incident light beam to form a reflected light beam which makes an acute angle with the rotor spin axis; a light beam splitter mounted on said housing along the stator reference axis for transmitting the incident light beam along the stator reference axis to said mirror and reflecting the reflected light beam from said mirror away from said reference axis, so that the spinning of the rotor member causes the light beam reflected from the beam splitter to rotate and trace a circular path, whereby angular deviations of the rotor spin axis in said first plane cause the center of said circular path to follow a first line of movement and angular deviations of the rotor spin axis in said second plane cause the center of the circular path to follow a second line of movement perpendicular to said first line of movement; and photoelectric transducer means having four independently operable coplanar portions mounted on the interior of the housing for actuation by the rotating light beam from said beam splitter, the four transducer portions being defined by a pair of mutually-perpendicular dividing lines which are coincident with the said mutually-perpendicular lines of movement of the center of the circular path, so that each of said transducer portions produces a series of output pulses having a pulse repetition rate corresponding to the rotor spin speed and a pulse width corresponding to the length of the path traced by the light beam in that portion, whereby the relative magnitudes of the pulse widths of the four series of output pulses from the transducer means completely define the angular deviation between the rotor spin axis and the stator reference axis in both of said first and second planes.

10. Photodynamic pickoff means as claimed in claim 9, wherein said lens is mounted on the housing along the stator reference axis, said light source is mounted on the housing a distance from the stator reference axis, and a mirror is mounted on the housing along the stator reference axis for reflecting the light from the light source to the lens, to thereby lengthen the optical path between the light source and lens and decrease the size of the light spot formed by the rotating beam of light on said photoelectric transducer means.

11. Photodynamic pickoff means as claimed in claim 9, wherein said light source, lens and beam splitter are mounted in a projection extending interiorly of the housing along the stator reference axis and said photoelectric transducer means is mounted in an opening formed in the housing wall, so that said beam splitter and transducer function as portions of the housing wall to separate the interior and exterior portions of the housing.

References Cited

UNITED STATES PATENTS

| | | | |
|---|---|---|---|
| 2,948,813 | 8/1960 | Osborne | 74—5.6 XR |
| 3,142,183 | 7/1964 | Done | 74—5.6 XR |
| 3,277,304 | 10/1966 | Vyce | 74—5.6 XR |
| 3,323,378 | 6/1967 | Powell | 74—5.6 |
| 3,355,953 | 12/1967 | Johnson | 74—5 |
| 3,379,889 | 4/1968 | Barnett et al. | 250—215 |

FRED C. MATTERN, JR., Primary Examiner

M. ANTONAKAS, Assistant Examiner

U.S. Cl. X.R.

250—215

PO-1050
(5/69)

UNITED STATES PATENT OFFICE
CERTIFICATE OF CORRECTION

Patent No. 3,501,966          Dated March 24, 1970

Inventor(s) Sol Shapiro et al

It is certified that error appears in the above-identified patent and that said Letters Patent are hereby corrected as shown below:

Column 2, line 36, correct the spelling of "exerting".
Column 2, line 61, change the word "motor" to --rotor--.
Column 3, line 7, correct spelling of "Evans".
Column 3, line 33, correct spelling of "De Cotiis".
Column 4, line 43, correct spelling of "permitted".
Column 6, line 24, change the word "aforemention" to --aforementioned--
Column 6, line 70, after the word "gas" insert --jets from--.
Column 9, line 60, delete the word "is", first occurrence.
Column 9, line 60, after the word "in", insert --which--.
Column 11, line 33, correct the spelling of "lengthening".
Column 12, line 7, correct the spelling of "signal".
Column 14, line 25, after the word "beam", insert --of--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents